Jan. 25, 1966 TADASHI SAITO ETAL 3,230,606
METHOD AND APPARATUS FOR ROLLING RINGS
Filed June 28, 1965 5 Sheets-Sheet 1

TADASHI SAITO AND
MASAYA SAITO
INVENTORS

By Wenderoth, Lind & Ponack
ATTORNEYS

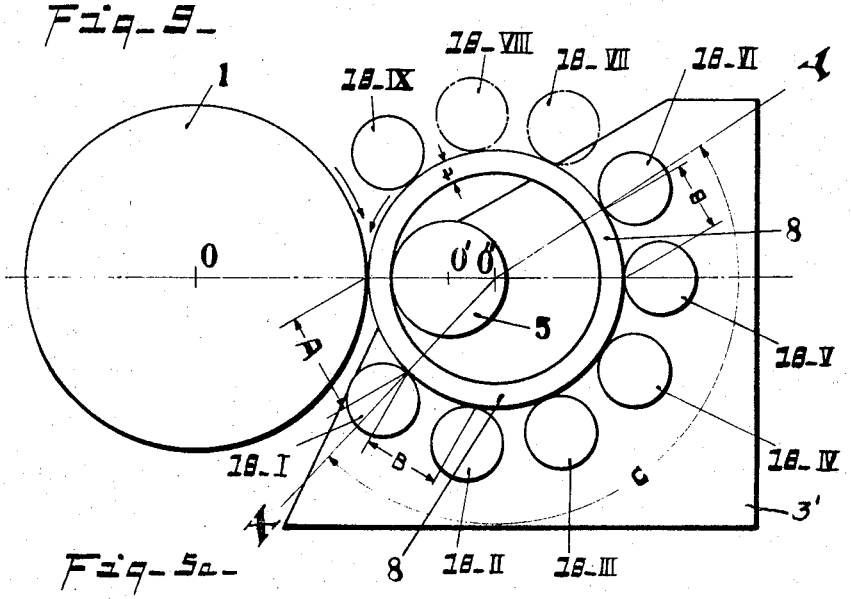
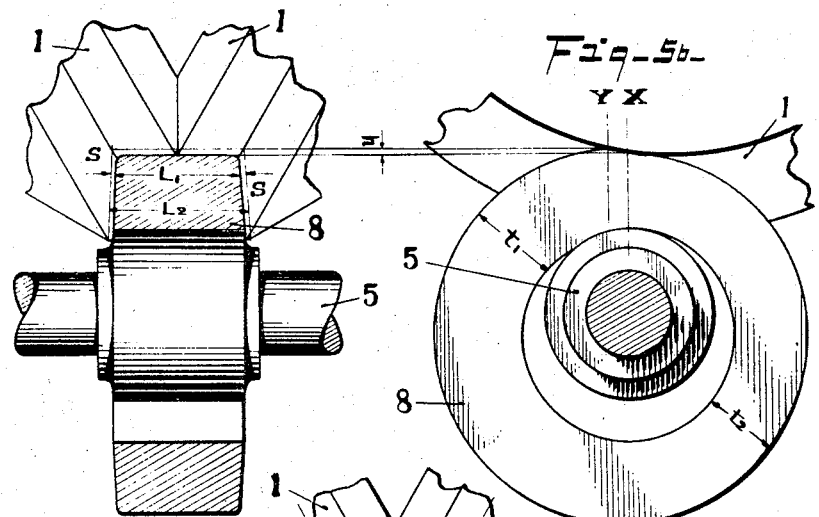
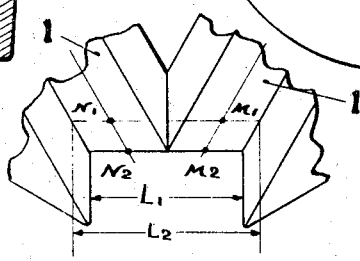

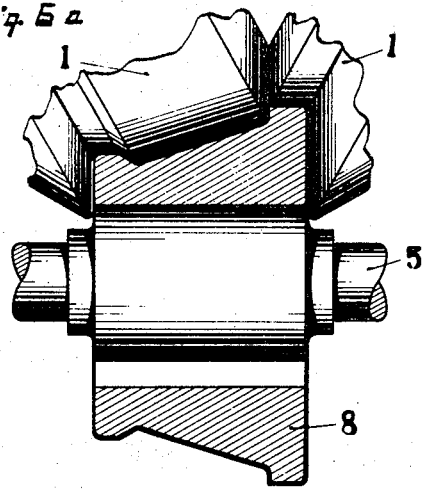
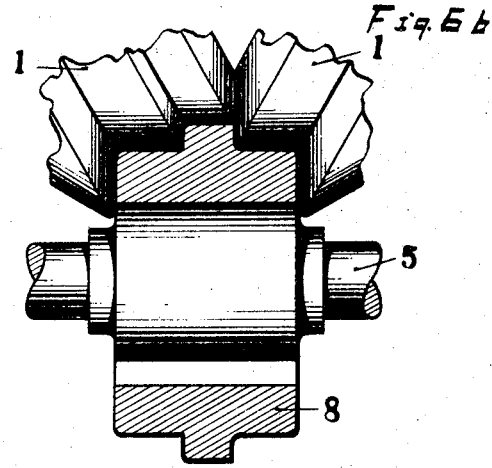
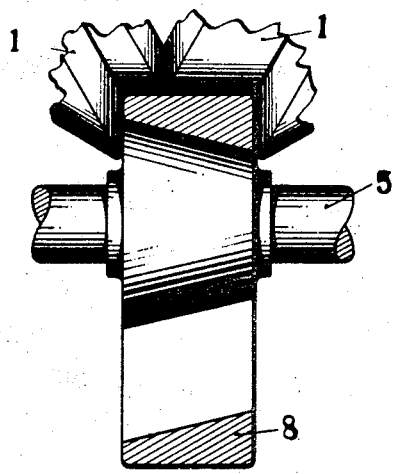
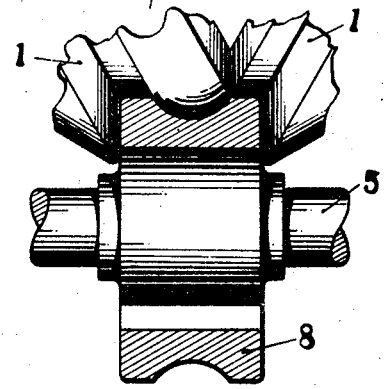
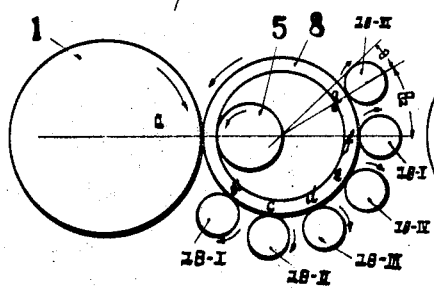
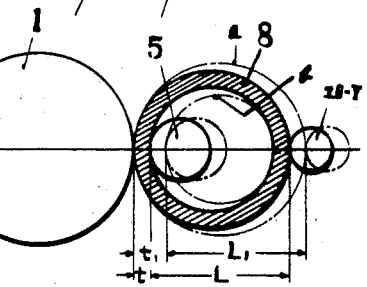
TADASHI SAITO AND MASAYA SAITO INVENTORS

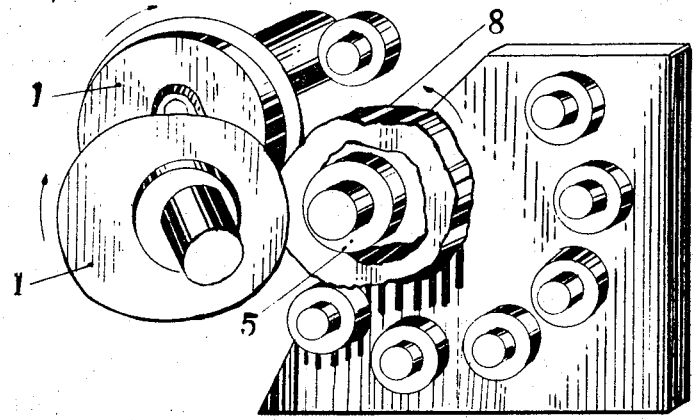
Fig-10a-
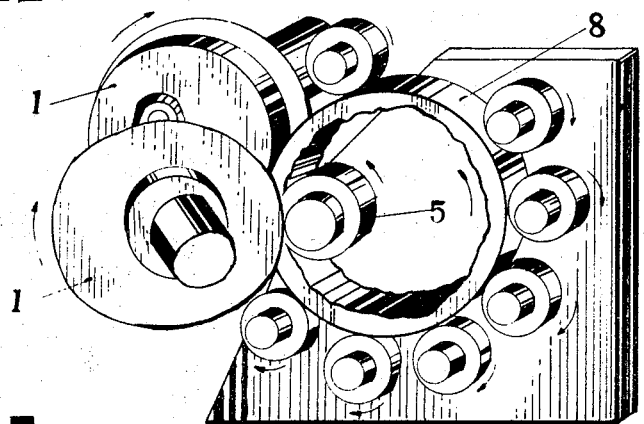
Fig-10b-
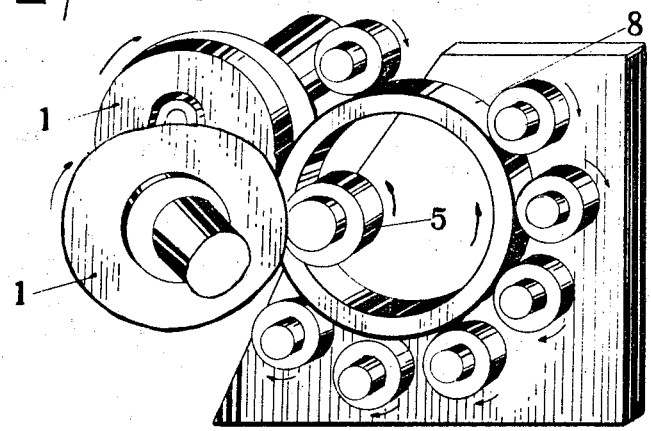
Fig-10c-
TADASHI SAITO AND
MASAYA SAITO
INVENTORS

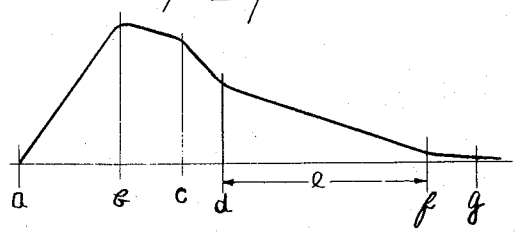
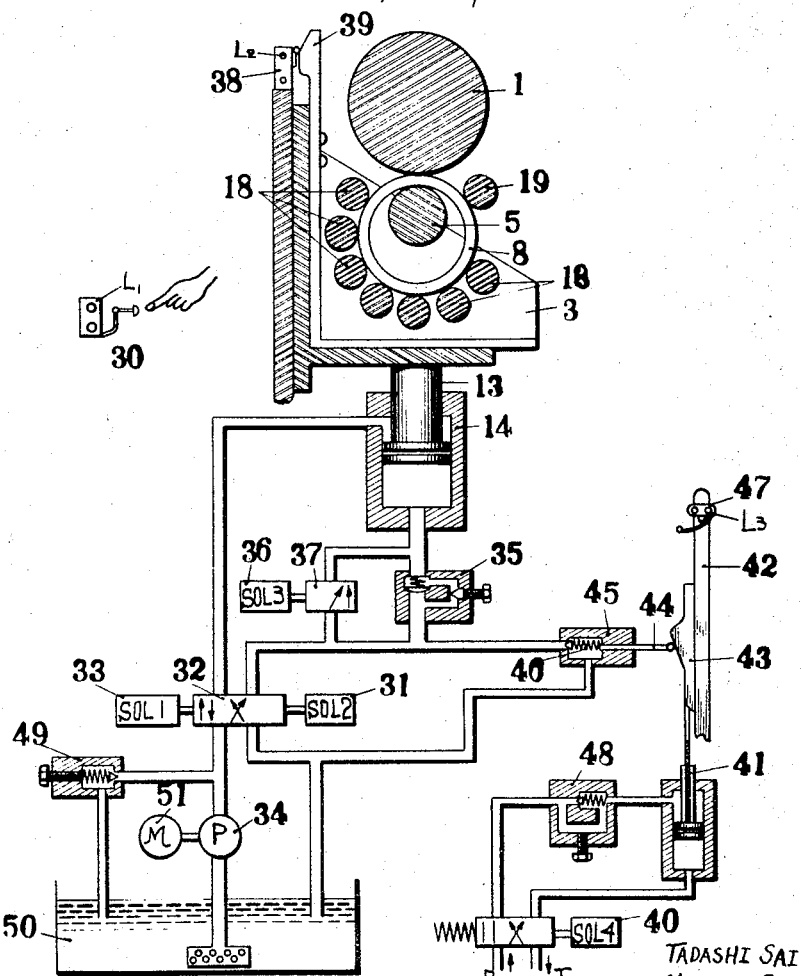

United States Patent Office 3,230,606
Patented Jan. 25, 1966

3,230,606
METHOD AND APPARATUS FOR ROLLING RINGS
Tadashi Saito, 333—31 Aza-koshinzuka Ishoshi, and Masaya Saito, 23—13 Aza-hiratsuka Obayashi, both of Takarazuka, Japan
Filed June 28, 1965, Ser. No. 467,544
8 Claims. (Cl. 29—148.4)

This invention relates to a method of manufacturing outer and inner bearing races and improvements in an apparatus therefor.

This application is a continuation-in-part of application Serial No. 269,019, filed March 29, 1963, now abandoned.

It is an object of the invention to provide an apparatus and a method of using the apparatus which will produce roll finished bearing races in a single apparatus. A further object of the invention is to roll the peripheral and lateral sides at the same time in one operation and produce well finished bearing races which are satisfactory with respect to precision and cost.

Another object of the invention is to roll the ring material with main rollers, an inner roller and supporting rollers and expand the outer diameter of the ring material and also reduce the cross sectional area of the ring material during the initial period of rolling, and after the outer peripheral surface of the ring material has come in contact with at least some of the supporting rollers, to enlarge the cross sectional area of the material by the use of the main rollers and an inner roller while keeping said outer diameter expanded during the additional rolling so that an additional process for smoothing and modifying the ring material can be omitted.

The apparatus for carrying out the method comprises a pair of main rollers, the axes of which are inclined to each other, and which rollers are disposed symmetrically with respect to each other and butted together at the lower portions thereof, each of said rollers having at least two smooth converging surfaces, one of said surfaces on each roller being adapted to roll a lateral face of the ring material and being spaced from and opposed to the corresponding surface on the other roller, and the other surface on each roller being adapted to roll a peripheral surface of said material and being contiguous with the corresponding surface on the other roller, the profiles of said surfaces taken in a plane through the axis of the bearing race together defining the cross sectional shape of the finished peripheral and lateral surfaces of the bearing race, said rollers being capable, during operation, of rolling said lateral and peripheral surfaces at the same time in one operation. An inner roller is positioned opposite the portions of said main rollers which abut each other, and has a cross sectional shape at the periphery thereof corresponding to the cross sectional shape of the inner peripheral surface of the bearing race, and a plurality of supporting rollers are spaced around the periphery of the space in which the ring is to be rolled in such a manner that each of the rollers comes into contact with the outer periphery of the ring when the ring has been rolled to its final size, so that the outer diameter and periphery of the finished ring are determined by said supporting rollers. Said supporting rollers are positioned at small intervals from each other, so that the tendency of the ring being rolled to bulge or otherwise be deformed by a force acting in the radical direction is eliminated. After an initial period of rolling when the ring has first reached its final outside diameter, rolling with the main roller and an inner roller is continued so as to expand the cross sectional size of the ring inwardly, the outer diameter of the ring being maintained by supporting rollers during the additional period of rolling until every surface of the finished ring is smooth and the size is accurate.

Further objects of the present invention will become apparent from the following specification and claims, taken together with the accompanying drawings, in which:

Figure 1:
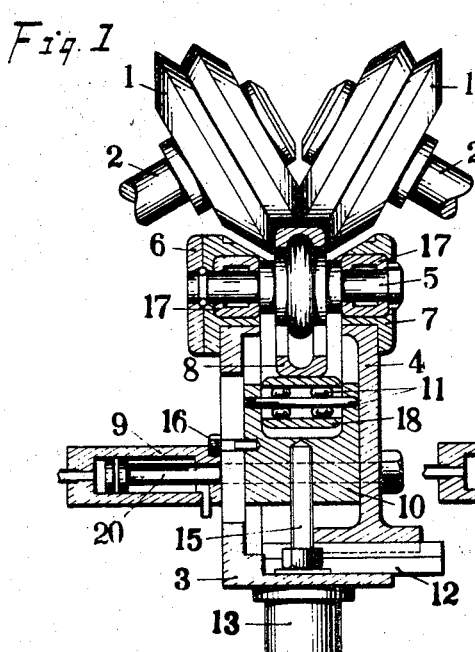
FIG. 1 is a sectional front elevational view of a ring rolling apparatus according to the invention in the operating condition.
Figure 2:
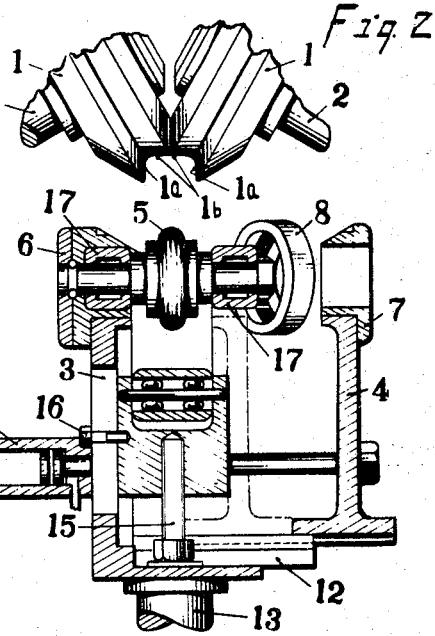
FIG. 2 is a view similar to FIG. 1 showing a ring being removed from said apparatus.
Figure 3:
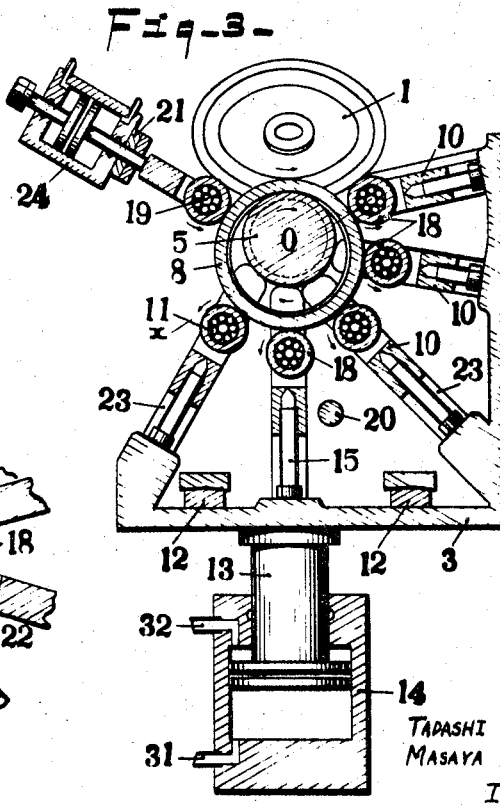
FIG. 3 is a sectional side elevation view of the apparatus of FIG. 1 showing the material being rolled.

FIGS. 5a, 5b, and 5c are diagrammatic views of the action of the rollers of the apparatus during rolling;

FIGS. 6a, 6b, 6c, and 6d are sectional views of various shapes of rings which can be produced by rolling;

FIGS. 7 and 8 are diagrammatic views of the method of operating the ring-rolling apparatus according to the invention;

FIG. 9 is a diagram illustrating certain parameters in the method of ring-rolling according to the invention;

FIGS. 10a, 10b, and 10c are diagrammatic views of a ring being rolled according to the invention;

FIG. 11 is a graph showing the pressure in the actuating means for the apparatus of FIGS. 1–3; and FIG. 12 is a part diagrammatic and part sectional view of a pressure control system to control pressure during rolling according to method of the invention.

Referring to FIG. 1, the apparatus according to the invention comprises two main rollers 1 disposed symmetrically with respect to each other and shafts 2 on which the rollers 1 are mounted in an inclined position relative to each other so that the lower portions of the rollers are butted together. Each of the rollers has two smooth surfaces 1a and 1b, the surfaces 1a converging with each other in the peripheral direction of the rollers 1, one of the surfaces 1a on each roller being adapted to roll the lateral or end face of the ring material 8 and being spaced from and opposed to the corresponding surface 1a on the other roller, and the other surfaces 1b on each roller being adapted to roll the outer peripheral surface of the material and being contiguous and coplanar with the corresponding surface 1b on the other roller. The surfaces 1a and 1b together have a profile corresponding to the cross sectional profile of the outer peripheral and lateral end surfaces of the finished bearing race being rolled.

It will be appreciated that the shapes of the rollers 1 need not be that shown in FIGS. 1 and 2. Other shapes are possible, such as those in FIGS. 6a, 6b, to be described hereinafter. The shapes of all of the rollers, however, are such that the opposed surfaces 1a roll the lateral end surfaces of the ring material and the surfaces 1b roll the outer peripheral surface at the same time.

An inner roller 5 having stub shafts thereon is provided on which the inner peripheral surface of the ring is rolled. The inner roller 5 is mounted in bearings 17, the left-hand one of which is mounted in a bearing cover 6 on a fixed bearing support 3, and the right-hand one of which is mounted in a bearing cover 7 on a movable bearing support 4. The movable bearing support is slidably mounted on the extension 12 on the fixed bearing support 3 for sliding movement axially of the stub shafts of the inner roller 5. Fixed frame 3 is in turn mounted on a piston 13 which is slidable in a cylinder 14 in a direction axially of piston 13. Movable bearing support 4 is fastened to a piston 20 which extends out of cylinder 9 mounted on the fixed frame 3. Conventional connections 31 and 32 for pressure fluid are provided on a cylinder 14, and similar connections (unnumbered) are provided on cylinder 9.

Positioned on a circle around the inner roller 5 is a plurality of supporting rollers, here shown as five rollers 18, which are located along an arc which corresponds to the peripheral surface of the ring when the ring has been rolled to the desired dimension. Each roller 18 is rotatably mounted on a roller bearing 11 which in turn is mounted on a bearing support 10 slidably mounted between a pair of arms 23 extending substantially radially inwardly toward the axis of the finished ring from the fixed frame 3. The bearing supports 10 each have a bolt 15 threaded into them with the heads of the bolts resting against the frame 3. Rotation of the bolts 15 moves the bearing supports 10 toward and away from the inner roller 5, thereby making it possible to adjust the size of the arc along which the rollers 18 lie. In addition, there is provided a further supporting roller 19 which is mounted on the piston rod of a piston-cylinder mechanism 24, and a limit nut 21 is threaded on the piston rod.

It will be seen that the rollers 18 are spaced around the arc of the finished ring. The spacing is along slightly less than half the circumference of the finished ring, the center of the last roller being in a position V short of a position diametrically opposite the roller 18 in position I by an angle $\theta$ which is equal to the angle between a radius from the center of the finished ring and the center of the roller 18 in position V and a radius from the center of the finished ring and tangent to the periphery of the said roller 18. The remaining rollers 18 in positions II–IV are equally spaced between the rollers in positions I and V at angles of $\theta_2$ from each other.

An embodiment with six supporting rollers 18I–18VI is shown in FIG. 7. As with FIGS. 1–4, the center of the last roller 18VI is in a position short of a position diametrically opposite the first roller 18I by an angle $\theta$ which is equal to the angle subtended by a radial line through the center of roller 18VI and the diameter through roller 18I. The other rollers are equally spaced at angles of $\theta_2$.

Figure 4:
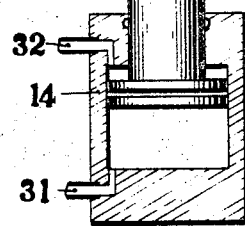
FIG. 4 is a partial side elevation view showing the material as initially placed in said apparatus.

In operation, with the fixed bearing support 3 lowered in the FIG. 2 position, the movable bearing support 4 is moved away from the fixed bearing support 3 by actuating the piston-cylinder mechanism 9, 20, to the position shown in FIG. 2. A ring blank of a size such as is shown in solid lines in FIG. 4 is placed around the roller 5, and the movable bearing support is returned to the FIG. 1 position. The bolts 15 are rotated to position the supporting rollers 18 along an arc corresponding to the size of the finished ring, and the piston-cylinder mechanism 13, 14 is actuated to raise the fixed bearing frame 3 upwardly until the ring blank is within the space defined by the main rollers 1. The auxiliary support roller 19 is then moved against the ring blank by actuating the piston cylinder mechanism 24. The main rollers 1 are rotated and the ring blank is rolled into a ring, the auxiliary roller 19 being retracted as the diameter of the ring increases while pressure is kept on the ring by the roller 19. The expansion of the outer peripheral surface of the ring is continued by the continued pressure of piston-cylinder mechanism 13, 14 until this outer peripheral surface comes into contact with the supporting rollers 18, at which time the auxiliary roller 19 is stopped by the abutment of the limit nut with the cylinder 24.

In conventional methods of rolling rings, the rolling process is complete when the ring reaches the desired size, so that an additional process of planing and modifying the finished ring is necessary. In the present invention, on the other hand, the expansion of the outer peripheral surface of the ring to the desired size and reduction of its cross sectional size is only the first step in the rolling process. In addition the ring is rolled further to expand the cross sectional size of the material of the ring without changing the diameter of the outer peripheral surface and to finish the surfaces of the ring.

Referring to FIG. 7, in which there are six supporting rollers, after the outer peripheral surface of the ring has been expanded until it contacts the supporting rollers 18-I—18-VI at the points $b$–$g$, pressure is still exerted on the inner roller 5 forcing it against the ring 8 where it contacts the main rollers at $a$, so that the ring material 8 is still under a pressure tending to expand it. It should be noted also that the cross sectional size of the ring material is being reduced along with the expansion of the outside diameter of the ring. However, since it is in contact with the supporting rollers, it cannot expand any further outwardly, and its cross sectional size accordingly is expanded toward the inside or it is forced out through the spaces between the rollers 18.

In the apparatus of the present invention, the number of supporting rollers 18 is chosen so that escape of the ring material through the spaces between the rollers is prevented; i.e. the angle $\theta_2$ must be such that the ring material is not forced out between the rollers 18.

During the first part of the rolling method of the present invention, as shown diagrammatically in FIG. 10a, the outer peripheral surface of the ring blank is expanded until it reaches the size determined by the positions of the supporting rollers 18, as shown in FIG. 10b. At this point the inside surface is uneven. After this portion of the process is completed the rolling is continued and the cross sectional size of the material of the ring blank is increased toward the inside without substantially changing the outside diameter already substantially finished by the action of the inner roller 5, the main rollers 1 and the supporting roller 18. As will be clear from a comparison of FIGS. 10b and 10c, the effect of this further rolling is to smooth out the irregularities in the inside peripheral surface of the work, and the rolling down of the thicker portions and evening out the overall thickness tends to enlarge the cross section of the ring slightly at the point between rollers 1 and 5, as will be described below. This is accompanied by a slight withdrawal of the roller 5 from the rollers 1, with the accompanying slight withdrawal movement of supporting rollers 18 which are on a common support with roller 5. This continued rolling of the ring contributes to the production of well finished rings which can be used as races for bearings.

In the method of the present invention, when the cross sectional size of the ring blank 8 is increased during the continued rolling, it is worked and forced into the space defined between the main rollers 1 and the inner roller 5. This serves to conform the material to the desired final shape and eliminates faults in the material. The material from the thicker parts of the ring will be transferred to the parts of the ring which have a small cross section, and there will be produced well finished rings for use as bearing races, which rings have smooth and balanced sectional forms. The supporting rollers act to help shape perfectly finished rings which have exact diameters and which have a definite size gain over the blank.

The movement of the rollers 1 and 5 during the continued rolling which finishes the rings can be seen from FIG. 8. The main rollers 1 and the inner roller 5 roll the ring material 8 so as to produce partly finished rings with a thickness $t$ and a dimension L between the point of contact of the inner roller 5 and the point of contact of supporting roller 18–V, which dimension L is the same as in the finished ring. This is due to the structure of the apparatus, the rollers 5 and 18–V being mounted on the same support. Likewise, the width of the material of the blank 8 is fixed by the shape of the main rollers 1 and the space defined between them. The difference between the ring at the end of the expansion rolling step and the finished ring is therefore the difference in its thickness between the dimension $t_1$ and $t$, and the dimension $t$ is increased to the dimension $t_1$, as the inside roller 5 is moved away from the main roller 1, as the irregularities in the thickness are smoothed out, while at the same time the supporting roller 18–V remains spaced from roller 5 the distance L so that the dimension L of the rings stays the same. When the supporting rollers 18 and roller 5 reach their final positions, the supporting rollers 18 will lie exactly on the circumference of the finished ring which will then have the dimension $L_1=L$ as established by the spacing of the roller 5 and roller 18–V.

The ring material 8 has its outer diameter fixed, in the embodiment of FIG. 7, by supporting rollers 18–I. 18–VI is also expanded toward the inside in the space defined between main rollers 1, being reduced to the size of this space at the time it passes through said space as it is being worked by the main rollers. The method and apparatus of the invention produce new effects because the main rollers 1, as they are rotating, approach the material 8 on an angle and approach it from both sides.

Referring to FIGS. 5a and 5b, the point of first engagement of the rollers 1 with the ring material 8 is shown at Y and the point of maximum rolling action is shown at X. The axial dimension of the ring material at point X is $L_1$, and during the time the main rollers 1 move to point X from point Y the ring material is rolled to reduce it an amount $h$ in the radial direction of the ring, and an amount S in the axial direction. Accordingly, in the present invention the effect produced is similar to that produced by two pairs of rollers at an angle to each other in a so-called straight line-rolling, and it is possible to roll side faces of finished rings, heretofore practically impossible in a ring rolling apparatus, at the same time the peripheral surfaces are rolled.

Referring to FIG. 5c, main rollers 1 rotate so that point $N_1$ thereon approaches point $N_2$ and point $M_1$ approaches point $M_2$ to roll the peripheral surface of finished rings, because said rollers 1 are in contact with each other along only one line. During rolling, tensile frictional resistances arise between the rollers 1 and the material, and although no drastic movement is produced thereby, the resistances do cause imperfections in the peripheral surface of the ring material 8 to move more to the point at which said rollers 1 touch each other as they approach from points $N_1$ and $M_1$ at the time the rollers engage the material to the points $N_2$ and $M_2$ where the maximum rolling effect occurs.

Referring to FIGS. 6a, 6b, and 6c, the effects which are produced during the manufacture of the forms illustrated in the drawings, and faults which occur in transforming the shape during rolling are overcome. Two main rollers having their axes of rotation inclined to each other at an obtuse angle and inclined downwardly from the horizontal are disposed symmetrically with respect to each other and in such a manner that said rollers are butted together at the lower portions thereof. Each of said rollers has two smooth converging surfaces, one of said surfaces being adapted to roll the peripheral surface of the ring material and the other surface being adapted to roll the lateral end surface of said ring material, the shape of the cross sectional profile of the surfaces together conforming to the shape of the cross sectional profile of the finished outer and lateral surfaces of the bearing race. Thus said surfaces of the ring material are able to be rolled in one operation, whereby the material may be easily and accurately rolled into a bearing race of the desired dimensions. FIGS. 6a, 6b, 6c, and 6d show various shapes which it is possible to roll.

By causing main rollers 1 to contact each other while their axes of rotation are inclined, it is possible to solve problems that have not been solved in conventional rolling methods. Moreover, the explanation of the effect produced by the side faces during rolling is that because the planes of rotation of the main rollers are at an angle to each other during formation of finished rings or races during the finish rolling process, the rollers part from the finished surfaces soon after rolling so that the separation of finished rings or races from the rollers occurs easily and quickly, and the action of the rolls is smooth. Therefore finished races having very accurate circular shapes are naturally formed and are easily produced.

During the first portion of the rolling, the outer diameter of the ring material is expanded until the outer periphery of the blank is substantially the size as determined by the positions of the supporting rollers 18, and after this portion of the process is completed, the rolling during which the material is rolled in the space defined by the surfaces of the rollers is continued until the ring has smooth faces and is accurate in size. The supporting rollers 18 are arranged on the circle to surround the periphery of the ring material, and the supporting roller 19 is therefore provided as shown in FIGS. 3 and 4.

Referring to FIG. 4, said supporting roller 19 is moved substantially radially outwardly from position Y to Z by the fluid pressure means 20 as the material 8 has its outside diameter increased, and roller 19 is in light contact with said material while the material is in the apparatus and prevents the material from being deflected and stops vibration of the material. Moreover, when the outside diameter of said material has increased so that its periphery is along line $d$ and its outer diameter has the desired size, the supporting roller 19 starts acting on the ring to produce a smooth finished surface having a circular shape of the desired size while the body is supported on rollers 18–I, 18–II, 18–III, 18–IV, 18–V and 18–VI, the limit nut 21 stopping the roller 19 at the proper position.

In a modified embodiment of the apparatus for carrying out the method of the invention as shown in FIG. 9, the rollers 18 spaced around the arc of the finished ring are arranged with the centers O of the main roller 1, O' of an inner roller 5 and O'' of a finished ring 8 positioned on a straight line. The space A between the point of contact of a first supporting roller 18–I with the periphery of the finished ring and the point of contact of main roller 1 with the finished ring is less than seven times of the cross sectional size of the finished ring as measured radially of the ring. The space B between each supporting roller is less than five times the cross sectional size of the finished ring also as measured radially of the ring, and the angle formed between a line X running through the center of the first supporting roller 18–I and the center O'' of the finished ring 8, and a line Y through center O'' and the center of supporting roller 18–VI is less than 175 degrees. Supporting rollers 18–I—18–VI, and rollers 18–VII and 18–VIII, where they are provided, are rotatably mounted on a fixed frame 3' on roller bearings and other supporting structure similar to that of FIGS. 1–3, and the further supporting roller 18–IX is attached to the portion of the apparatus which carries the two main rollers by means of a piston-cylinder mechanism similar to that the FIGS. 1–3.

The usual idea in conventional methods of rolling rings is that rolling should be performed under conditions which will produce the ring under powerful pressure and rotary power. On the contrary, in the rolling method of the present invention, this idea is fundamentally changed. Although light rolling pressure with far more possibility of damage is not permissible, the rolling power is not as high as that necessary and sufficient to roll the ring in one stroke, but rather the rolling rollers repeat their rolling action while the material rotates several times at high speed, so there is no necessity for excessive pressure on the ring during a single passage through the rollers.

The excessive pressures used in the past make rolling the average material impossible, because parts which are pressed under high rolling pressure are abruptly over-extended, and a true circular shape will not be obtained, and the method will produce faulty goods. In the present invention, the first rolling is carried out so as to form a ring no more than 1 mm. greater than about 5 mm. thick in the radial direction and the second or finishing rolling is for the purpose of forming a ring about 4 mm. thick, and these two rolling steps roll the material through the rollers without further pressure among the rollers. In addition, the rolling steps which act to roll the ring down to 5 mm. thick are not carried out in a single step but are carried out in five actions.

For the process of the invention, the second rolling for finishing the formation of the ring is carried out after an operation to average the sectional form around the material. In order to roll at high speed, perfect rolling of a ring having an outer diameter of 100 mm. should be carried out in a few minutes or more. The cycle of the pressure which is applied to the ring during rolling by using the rollers of the apparatus of the present invention is illustrated in FIG. 11. The pressure starts at the time represented by the point *a* and increases until the material begins to be expanded and the pressure reaches the time of point *b*, and the thickness of the material is reduced. The necessary pressure is then less due to the expansion of the material, so the pressure is reduced because of said condition and gradually the material is expanded.

The ring begins to rotate in the circle surrounded by the supporting rollers and next all the supporting rollers begin to rotate. This occurs at about the time designated by point *c*, at which point the rough rolling steps are completed. At this time the pressure is reduced abruptly so that there is little expansion during the time from point *c* to point *d* and gradually the pressure is reduced evenly during the period *e*.

The portion of the process in which the size of the cross section of the material is expanded toward the inside of the ring is carried out during the even reduction of pressure from the time at point *d* to the point *f*. During said period, in which the outer diameter is expanded, the cross sectional size of the material is reduced along with the expansion of the outer diameter, and during the additional period the outer diameter is changed hardly at all, although the size of the cross section of the material is increased. Accordingly, the shape of each finished ring is the same and each has smooth surfaces and make superior finished rings or races which have no imperfections thereon.

Moreover, in order for the rolling method to be most effective, the further rolling to expand the size of the cross sectional shape of the ring inwardly should be carried out in the same direction as the direction in which the ring is to run during its use in order to produce the best effect in terms of strength and stamina of the finished rings. The rolling process of this invention is finished at the end of time *e* and the pressure is reduced to the point *f*, and thereafter it is reduced to the point *g*.

When the rolling is finished, the apparatus is opened, as in FIG. 2, and the material in contact with the main roller 1 and supporting rollers 18–I, 18–II, 18–III, 18–IV, 18–V, and 18–VI is slipped out of the apparatus slowly over the course of several rotations, and the highly finished goods perfectly circular in form are produced.

In the invention, if excessive power is used, it is likely to damage the material, and thus the same consideration which makes high quality rings possible makes for efficient production as compared to prior art methods. Moreover, only minimum periodic repair is necessary.

The manner of using the oil pressure to control the rollers is very different from conventional methods. In FIG. 12, there is shown the oil pressure system. A starting switch 30 energizes solenoid 31 to move valve 32 to permit flow of oil from a pump 34 in the direction of the crossed arrows as shown in FIG. 12. Said flow flows through valve 37 and pushes the piston 13 out to the position as shown in FIG. 12 during which the rough rolling takes place. The electric limit switch 38 then is operated by cam 39 on frame 3 to energize the electric solenoid valve 36 before the main rollers 1 and inside roller 5 begin finish rolling of the material 8. The valve 37 is actuated to the shut position so as to stop the rough rolling and to start the next movement for finish rolling. At the same time, the solenoid valve 40 is operated to direct pressure fluid to push the piston 41 out as shown in FIG. 12, and said piston 41 slides the cam 43 along the base 42. Said cam 43 has a shape corresponding to the cycle as shown in FIG. 11, and the spring 46 in a relief valve 45 is compressed to a greater or lesser degree by the arm 44 as it slides on the face of the cam 43. During the slow and rapid movement of the cam 43, the oil pressure exerted on the piston 14 and thus on material moving through the main rollers 1 and the inside roller 5 is controlled by the face on valve 45 through the action of spring 46 and is varied by the action of the face of said cam 43 on rod 44. The control of pressure necessary to follow the curve in FIG. 11 is thereby obtained so that the apparatus can be operated automatically. When the cam 43 reaches the end of its movement, the electric limit switch 47 will be closed to energize the solenoid 33 and reverse the valve 32 to cause the piston 13 to move down, and finished rings or races for bearing will be slipped out from under main rollers 1. When the ring rolling process for one ring is finished, the process is repeated for the next ring.

Referring to FIG. 12, an electric motor 51 operates the pump 34 and a safety valve 49 limits the pressure in the system. A compression valve 35 is provided in a conduit to the cylinder 14, which valve has two paths, one of which is a bypass valve and the other of which limits flow through the valve 35. If a sudden and excessive pressure is placed on the rolling parts of said rollers 1 and 5 due to an eccentricity in the material during rolling, excessive pressure on the piston 13 through the rollers escapes through the compression valve 35. Large protuberances due to the eccentricity of the material should be rolled out during several rotations and the piston 13 should be able to exert the force necessary to crush such protuberances. For said force to be exerted it is necessary to close the bypass of the valve 35 to block it off and to roll the uneveness due to eccentricity under great force to overcome its flow resistance, and to roll it out while keeping the rollers stable. One path through valve 48 has a single valve movable to prevent free flow and the other path has a spring loaded valve member to control the flow, and the cam 43 operates according to the rolling cycle as shown in FIG. 11, and also returns rapidly. The oil tank 50 is also illustrated in FIG. 12.

Moreover, free rotation of the plurality of supporting rollers in the apparatus of the invention is easily accomplished by mounting them on needle rollers. In the method of the invention, during the ring rolling, all of the faces of the material are rolled at the same time so as to make the outer diameter of the ring expand and so as to reduce its cross sectional size during said expansion during the initial period, and then make its cross sectional size increase inwardly during the further finishing rolling, so that the sizes and forms of the finished rings and races are perfect and accurate. The rolling pressure operates within reasonable limits, and thus high quality products can be produced easily by the method of the invention.

What we claim is as follows:

1. An apparatus for manufacturing rings, especially for outer and inner bearing races, comprising a pair of main rollers the axes of which are inclined to each other, said rollers being disposed symmetrically with respect to each other with said rollers butted together at the lower portions thereof, each of said rollers having at least two smooth converging surfaces, one of said surfaces on each roller being adapted to roll the lateral side of the ring material and being spaced from and opposed to the corresponding surface on the other roller, and the other surface on each roller being adapted to roll the peripheral side of said material and being contiguous with the corresponding surface on the other roller, the cross sectional shape of said surfaces taken in a plane through the axis of the ring being rolled together conforming to the cross sectional shape of the finished outer and lateral surfaces of the ring, and being capable, in operation, of rolling said surfaces at the same time in one operation, an inner roller positioned below the butting portions of said main rollers and having a cross sectional shape at the periphery thereof corresponding to the cross sectional shape of the inner peripheral surface of the ring being rolled, and a plurality of supporting rollers spaced around the periphery of the space in which the ring is to be rolled in such a manner that each of the rollers comes into contact with the outer periphery of the ring when the ring has been rolled to expand its outer diameter to its finished size and expands its cross sectional size inwardly, the outer diameter and periphery of the finished ring being determined by said supporting rollers, said supporting rollers being arranged at small distances from each other, which distances are small relative to the thickness of the ring being rolled so as to eliminate the tendency of the ring being rolled to bulge or otherwise be deformed by forces acting in the radial direction, a common mounting on which said inner roller and supporting rollers are mounted, and means coupled to said mounting for applying pressure to said mounting and moving said mounting toward said main rollers to apply rolling pressure to the ring being rolled and controlling the pressure for finish rolling the rings.

2. An apparatus as claimed in claim 1, wherein at least one of said supporting rollers comprises a hydraulically actuated drive mechanism for driving the supporting roller radially of the shape of the finished ring, and said rollers are spaced around slightly less than one-half the periphery of the shape of said ring with the first supporting roller positioned immediately adjacent the main rollers and the inner roller on the side thereof toward which the main rollers and inner roller are adapted to roll a ring.

3. An apparatus as claimed in claim 2 in which supporting roller mounting means for each supporting roller are provided on said mounting, each supporting roller mounting means comprising a pair of arms extending substantially radially inwardly toward the axis of the ring being rolled, a bearing support slidably mounted between said arms, bearing means on said bearing support and on which the corresponding supporting roller is mounted, and means for moving said bearing supports along said arms on all of said mounting means other than the hydraulically actuated supporting roller comprising a threaded bolt threaded into the bearing support and having the head thereof against said mounting, whereby the positions of the supporting rollers can be adjusted to roll rings of different outside diameters.

4. An apparatus as claimed in claim 2 in which said hydraulically actuating supporting roller is adjacent the main rollers on the opposite side of the space defined between the main rollers and the inner roller from the first of the remainder of the supporting rollers.

5. An apparatus as claimed in claim 1 in which the axes of the main rollers are inclined to each other at an obtuse angle and are inclined downwardly from the horizontal for causing the lower portions of the main rollers to be butted together at the lower portions thereof.

6. An apparatus as claimed in claim 1 in which the inner roller has a stub shaft thereon and bearings in which the ends of the stub shaft are mounted, said apparatus further comprising a fixed bearing support having a bearing cover thereon in which the bearing on one end of the stub shaft is mounted, a movable bearing cover having a bearing support in which the bearing on the other end of the stub shaft is mounted, said fixed bearing support further having an extension thereon on which said movable bearing support is slidably mounted, and said means coupled to said mounting is a piston-cylinder means on the piston of which said mounting is mounted.

7. An apparatus as claimed in claim 1 in which point of contact of the first supporting roller with the ring being rolled is spaced from the point of contact of the main rollers with the ring being rolled a distance less than seven times the thickness of the ring being rolled as measured in the radial direction, and the points of contact of the successive supporting rollers with the ring being rolled are spaced a distance from each other no more than five times the thickness of the ring being rolled as measured in the radial direction.

8. A method of using an apparatus for manufacturing rings, especially for outer and inner bearing races, which apparatus has a pair of main rollers disposed symmetrically with respect to each other with said rollers butted together at the lower portions thereof, each of said rollers having at least two smooth converging surfaces, one of said surfaces on each roller being adapted to roll the lateral side of the ring material and being spaced from and opposed to the corresponding surface on the other roller, and the other surface on each roller being adapted to roll the peripheral side of said material and being contiguous with the corresponding surfaces on the other roller, the cross sectional shape of said surfaces taken parallel to the axis of the ring being rolled together conforming to the cross sectional shape of the finished outer and lateral surfaces of the ring, and being capable, in operation, of rolling said surfaces at the same time in one operation, an inner roller positioned below the butting end of said main rollers and having a cross sectional shape at the periphery thereof corresponding to the cross sectional shape of the inner peripheral surface of the ring being rolled, and a plurality of supporting rollers spaced around the periphery of the space in which the ring is to be rolled in such a manner that each of the rollers comes into contact with the outer periphery of the ring when the ring has been rolled to expand its outer diameter and reduce its cross sectional size so that the outer diameter and periphery of the finished ring are determined by said supporting rollers, said supporting rollers being arranged at small intervals so as to eliminate the tendency of the ring being rolled to bulge or otherwise be deformed between supporting rollers by the forces acting in the radial direction, said method comprising the steps of rolling the ring while exerting pressure on the inner roller to move it toward the main roller to expand the outer diameter thereof until it reaches the predetermined size as determined by the positions of the supporting rollers, and after said initial period of rolling, further rolling the ring with the main rollers while partially relieving the pressure on the inner roller and withdrawing it slightly to expand the cross sectional size of the ring inwardly while smoothing out the irregularities in the inner periphery of the ring and keeping said outer diameter and peripheral surface of the ring unchanged by rolling the ring against the supporting rollers during the additional period of the rolling until every surface of the finished ring is smooth and the size is accurate.

References Cited by the Examiner
UNITED STATES PATENTS

| | | | |
|---|---|---|---|
| 1,661,024 | 2/1928 | Venable | 72—111 |
| 1,744,549 | 1/1930 | Hopkins | 72—110 |
| 1,745,514 | 2/1930 | Taylor | 72—87 |
| 1,753,963 | 4/1930 | Mauser | 72—110 |
| 1,781,140 | 11/1930 | Taylor | 72—87 |

CHARLES W. LANHAM, *Primary Examiner.*

H. D. HOINKES, *Assistant Examiner.*